3,833,744
TEXTURIZING MATERIALS FOR FOODS
Ralph A. Bomstein, Hopkins, Minn., assignor to General Mills, Inc.
No Drawing. Filed Aug. 24, 1972, Ser. No. 283,615
Int. Cl. A22c 18/00
U.S. Cl. 426—212
14 Claims

ABSTRACT OF THE DISCLOSURE

Chitosan is complexed with acidic polysaccharides to yield materials useful as texturizing agents for foods.

The present invention relates to new texturizing materials for use in the production of foods. More particularly, it relates to the products obtained by the complexing of chitosan with acidic polysaccharides and to foods containing such texturizing bases.

I have now discovered that chitosan can be complexed or reacted with acidic polysaccharides to yield fibrous materials having a meat-like texture. When the acidic polysaccharide used is, like chitosan, non-utilizable by the human digestive system, the entire complex is non-caloric and constitutes prime material for the manufacture of foods of reduced calories.

Chitosan is deacetylated chitin. Chitin in turn is naturally occurring and is a beta-1,4-linked polymer of N-acetylglucosamine. Chitin occurs most commonly in the fungi and in the arthropods, where it is a principal component in the exoskeletons of crustaceans and insects. Chitosan, also termed 2-amino-2-deoxy-D-glucoglycan, is prepared by deacetylation with sodium hydroxide of chitin or the chitin source materials, especially crustacean shells and fungal mycelium.

A variety of acidic polysaccharides can be used in the present invention. These can be naturally occurring materials or synthetic derivatives of polysaccharides. One preferred group are the carboxymethyl celluloses which are commercially available materials. They are prepared by the reaction of cellulose with sodium chloroacetate in the presence of sodium hydroxide. They are generally sold in the form of their alkali metal (i.e. sodium) salts which salts are useful in the present invention. Such carboxymethyl celluloses are preferred in the present invention since they yield complexes of good textural properties and the over-all complexes are non-utilizable by the human digestive system.

Another preferred group of reactants are the carboxymethyl derivatives of polygalactomannans such as guar gum and locust bean gum. Again such derivatives are prepared by reaction of the polygalactomannans with sodium chloroacetate in the presence of sodium hydroxide as a reaction initiator. These materials are also useful in the form of their alkali metal salts.

Another group of synthesized acidic polysaccharides useful in the present invention are the microbial gums. Such Xanthomonas gums are the fermentation products produced by the action of the bacterium *Xanthomonas campestris* upon carbohydrates. Carbohydrates useful in the reaction include simple sugars, such as glucose and fructose, sucrose, starch and starch hydrolyzates. The reaction is carried out in the presence of selected minerals including phosphate and magnesium ions and a nitrogen source, usually a protein. Such materials are commercially available and, in general, the commercial process involves growing the bacteria, inoculating a small batch of fermentable broth with the bacteria, allowing the small batch to ferment, inoculating a large batch of fermentable broth with the previously fermented small batch of broth, allowing the large batch to ferment, sterilizing the broth and finally recovering the Xanthomonas gum from the broth.

Naturally occurring acidic polysaccharides useful in the invention include polyuronides such as algin (especially sodium alginate) and pectins (i.e. low methoxyl pectin) and other gums such as carrageenan.

The complexes of the present invention are prepared by mixing fluid aqueous solutions of the chitosan and the acidic polysaccharide and collecting the resulting precipitated complexes. Although the term solution is used, it is to be understood that the reactants may be in the form of colloidal dispersions and solution is intended to cover such dispersions. The chitosan is solubilized through the use of water soluble organic acids such as citric acid, formic acid, acetic acid, tartaric acid and the like. Dilute acetic acid is a preferred acid because chitosan is readily solubilized therein and its cost is low. Citric acid is another preferred acid since the complexes obtained when the chitosan is solubilized or partially solubilized therewith tend to be somewhat stronger or tougher and thus have increased usefulness as texturizing agents. Citric acid is particularly effective when used in conjunction with acetic acid as the main solubilizer and calcium ions which toughen the fibrous product. The citric acid serves to reduce the amount of free calcium ions and acts as a buffer to help retain the pH of the reaction in the 5.0–5.5 range.

The fluid aqueous solutions to be mixed normally are relatively dilute (i.e. they contain less than about 10% by weight of the reactant). Thus the various reactants are generally thickeners for water and high concentrations cause loss of fluidity. It is preferred to use concentrations of less than 4% by weight of both the chitosan and the acidic polysaccharide in the respective solutions. An especially preferred range is from about 0.25 to 2.0% by weight of the respective reactants.

The chitosan and acidic polysaccharide are used in ratios which yield the complex having texturizing properties. Such reactants are complex materials and thus the precise amount of acidic polysaccharide used to produce complexes with optimum properties with the chitosan will vary somewhat dependent on the particular polysaccharide. Chitosan itself has a marked astringent taste theorized to arise from the free amino groups of the molecules. These groups are partially or wholly blocked by formation of salt linkages with the acidic polysaccharides. Thus, the weight of the chitosan employed in the formation of the complexes depends somewhat upon the degree of substitution (D.S.) and the average molecular weights of both the chitosan and the acidic polysaccharides. Chitosan produced as described herein has a D.S. of about 0.8 with respect to the free amino groups. To form complexes in which the amino groups are fully reacted, an equal weight of acidic polysaccharide with a D.S. of 0.8 is required. In practice, complexes with good texturizing properties and no astringency are obtained with weight ratios of chitosan to acidic polysaccharide (where both reactants have a D.S. of about 0.8) in the range of about 0.8 to 1.2 to 1.2 to 0.8. Of course, these ratios are altered proportionally in accordance with the D.S. value of the acidic polysaccharide compared with that of the chitosan.

I have also found that the presence of calcium ions often gives beneficial results. Thus complexes prepared in the presence thereof often have increased strength and are more readily filtered or separated from the aqueous reaction medium. The calcium ions may be derived from any of a variety of water soluble calcium salts. Calcium chloride is especially preferred.

Other materials can also be present during the complexing reaction. Thus it is possible to include proteins which then are captured by the complex. A variety of proteins such as soy isolate, casein, whey, gluten and the like may be used as additives.

As indicated, the complexes of the present invention are useful as texturizing agents for foods. Thus they can be used in combination with natural meats, fish, fowl and the like to produce extended products of good quality and reduced calories. They can also be used as the building blocks of various foods such as meat analogs through the addition of flavors, colors and the like.

The following examples illustrate preferred embodiments of the invention without being limiting. Unless otherwise indicated, all parts and percentages are by weight and all solutions are aqueous solutions.

EXAMPLE I

A. Preparation of Chitosan

One hundred grams of chitin prepared by conventional methods from crustacean shells were suspended in one liter of 60% sodium hydroxide (wt./vol.) at 123° C. in a two-liter, 2-necked round bottom flask set in an electrically energized heating mantle. The flask contents were stirred magnetically and kept under nitrogen for 90 minutes at 123° C. At the end of the heating period the suspension was poured into an equal volume of tap water and the resulting suspension filtered. The retentate was washed with water until the pH was less than 8.0. The chitosan so obtained was washed with acetone and air dried. The yield was 78 g. and the chitosan had a Kjeldahl nitrogen content of about 6.4%. The chitosan was readily soluble at 1% concentration in 0.5% acetic acid.

B. Preparation of Fibrous Product

Five hundred mg. of the chitosan of Part A above was suspended in 99.7 ml. of water. To this suspension 0.3 ml. glacial acetic acid was added and the suspension stirred until all the chitosan dissolved to give a clear, almost colorless solution. To this solution was then added 345 mg. citric acid monohydrate with stirring and 170 mg. anhydrous calcium chloride. A second solution was prepared by dissolving 250 mg. of sodium carboxymethyl cellulose (CMC 9M8F) and 150 mg. sodium bicarbonate in 50 ml. of water. The chitosan solution was then added to this second carboxymethyl cellulose solution with vigorous stirring. A fibrous precipitate was formed and collected on a sieve. The yield of product was 89% based on the chitosan and carboxymethyl cellulose employed. The final pH of the reaction mixture was 5.3. The fibrous product so obtained was white, bland and possessed a texture closely resembling that of meat.

C. Meatball Extension

The fibrous product obtained in Part B above was passed through a Kitchen Aid® mixer-grinder to render the fibrous material shorter in length. The ground wet product was thoroughly mixed with an equal weight of ground chuck (beef) and formed into meat balls. The meat balls were then heated in a spaghetti sauce for 25 minutes at 100° C. Compared with unextended all ground chuck controls, the fiber extended product of the invention was essentially undistinguishable in texture and flavor. The extended meat balls had a calorie reduction of 50% compared to the all meat controls.

D. Luncheon Meat Preparation

An equal weight of the fibrous product of Part B above was thoroughly mixed with a luncheon meat emulsion. The resulting mixture was placed in a 202 x 107 can and the can was sealed and retorted for 10 minutes at 120° C. The resulting product was very similar to Spam® in texture and flavor but with about 50% of the calorie content of Spam®. The luncheon meat emulsion used in this Example was prepared from 55 parts trimmed lean beef, 45 parts regular pork trimmings, 2¾ parts salt, 1 part glucose and ¾ part seasonings. The beef was ground through a ⁹⁄₁₆ inch plate and placed in a silent cutter along with the remaining ingredients except the pork. The mixture was chopped for one minute and then the pork was added and chopping continued for two minutes.

EXAMPLE II

Example I, Part A was essentially repeated except that heating was terminated after 35 minutes. The chitosan so prepared readily dispersed in dilute acetic acid to give viscous dispersions, typically about 4500 centipoises when measured with a No. 2 spindle in a Brookfield viscometer at 20° C. in 1% concentration at 2.5 r.p.m. A solution of five grams of the chitosan in two liters of 0.25% acetic acid was mixed with a solution of five grams of carboxymethyl cellulose as used in Example I in two liters of water. The resulting gelatinous fibrous precipitate was partially dehydrated with 50% ethanol in water to yield fibers having a meat-like texture. A portion of the above fibers was mixed with three times its weight of ground beef and the mixture formed into patties. The fiber-containing patties were judged to be slightly tougher in texture than all meat control patties when fried.

EXAMPLE III

A chitosan solution was prepared at 0.5% concentration in 0.25% acetic acid. A 0.5% carboxymethyl cellulose (CMC 4M65F) solution was separately prepared and divided into six equal aliquots. To each aliquot calcium chloride was added to give concentrations of increasing strength starting with 0.2% and increasing through 0.4, 0.6, 0.8, 1.0 and 2%. Then fibers were formed by mixing equal volumes of the chitosan solution and the various carboxymethyl cellulose solution. The fibers were gelatinous and difficult to filter at the 0.2 and 0.4% CaCl$_2$ levels, much less gelatinous and readily filterable at 0.6, 0.8 and 1% CaCl$_2$ levels and quite soft at the 2% CaCl$_2$ level.

EXAMPLE IV

Example III was essentially repeated except that the carboxymethyl cellulose used was the same as used in Example I. Results were similar to those of Example III except that at the 2% CaCl$_2$ level, the fibrous product was quite dry compared with the other preparations.

EXAMPLE V

Fifty ml. portions of a 0.5% chitosan solution in 0.15% acetic acid were mixed with 50 ml. solutions of 0.5% sodium alginate (Kelgin® F) containing 500 mg. anhydrous calcium chloride and varying concentrations of citric acid monohydrate adjusted to pH 6.5 with sodium hydroxide. When the alginate solution contained no citric acid, the final pH of the reaction mixture was 5.1 and the fibrous product formed was very tough and dry when chewed. When the alginate solutions contained .25, .50, .75 and 1.0 g. citric acid monohydrate, respectively, results were as follows:

.25—fibers softened but still quite tough when chewed (final pH 5.2)
.50—fibers a little dry when chewed but softer in texture than the .25 fibers (final pH 5.3)
.75—fibers were a little soft compared with meat when chewed, more moist than the .50 fibers (final pH 5.3)
1.0—fibers were relatively mushy (final pH 5.4)

EXAMPLE VI

A solution of 300 ml. of 4% chitosan in 2% acetic acid containing 2.07 g. citric acid monohydrate and 1.02 g. anhydrous calcium chloride was mixed in a Waring Blendor with 300 ml. 4% carboxymethyl cellulose as used in Example I containing 4.56 g. sodium bicarbonate. Mixing was at a rheostat setting of 35 for ten minutes. Yield of fiber was 77% and the final pH of the reaction mixture was 5.2.

EXAMPLE VII

The following illustrate fiber preparations utilizing added protein:

(a) Twenty-five ml. of a solution of 0.5% chitosan in 0.15% acetic acid containing 245 mg. citric acid monohydrate and 250 mg. $NaHCO_3$ was mixed with 25 ml. of a 1% solution of carboxymethyl cellulose as used in Example I and 25 ml. of a 1% solution of whey protein. Final pH of the reaction mixture was 4.5. Yield of fiber was 70% based on the starting weights of the chitosan, carboxymethyl cellulose and protein.

(b) Fifty ml. of a 0.5% solution of chitosan in 0.15% acetic acid containing 395 mg. citric acid monohydrate and 350 mg. anhydrous calcium chloride was mixed with 25 ml. of a 1% solution of carboxymethyl cellulose as used in Example I containing 250 mg. sodium bicarbonate and 25 ml. of a 1% aqueous dispersion of gluten (Pro 80). Final pH of the reaction mixture was 4.6 and the yield of fiber was 88% based on the chitosan, carboxymethyl cellulose and gluten.

(c) Twenty-five ml. of a 0.5% solution of chitosan in 0.25% acetic acid containing 345 mg. citric acid monohydrate and 263 mg. anhydrous calcium chloride was mixed with 25 ml. of a 0.5% solution of sodium alginate (Kelgin® F) and 25 ml. of a 5% aqueous dispersion of soy isolate (Promine® R) containing 250 mg. sodium bicarbonate. Yield of fiber was 88% and the final pH of the reaction mixture was 5.0.

EXAMPLE VIII

A. Fiber Preparation

To a suspension of 63 g. chitosan in 2520 ml. of water was added 630 ml. of 20% tartaric acid to dissolve the chitosan. This solution was diluted with an equal volume (3150 ml.) of water to give a 1% chitosan tartrate solution. Separately, 50.4 g. sodium carboxymethyl guar having a D.S. of 0.7–1.2 was dissolved in 5040 ml. water to give a 1% solution. A third solution was made by dissolving 12.6 g. sodium carboxymethyl guar having a D.S. of greater than 1.2 in 1260 ml. water to give a 1% solution. The two carboxymethyl guar solutions were combined. The chitosan solution was then added to the combined carboxymethyl guar solution under moderate stirring at an addition rate of 150 ml./min. The precipitated fibers were recovered by filtration in vacuo and washed with water until free of acid. The fibers were partially dried by use of a rubber dam in vacuo. Water content of the "dried" fibers was 84%. The fibers had a good meat-like texture when chewed.

B. Meat Extension

The fibers of Part A above were passed through a meat grinder attachment of a Kitchen-Aid® mixer using the largest hole die. The ground fibers were then mixed by hand with three times their weight of ground beef and patties formed therefrom. The patties held together well before and during frying in an electric fry pan. Hamburgers so produced had a texture very close to that of controls made from 100% meat.

By degree of substitution (D.S. as used in the above example (and also with reference to carboxymethyl cellulose as discussed hereinbelow) is meant the average substitution of carboxymethyl ether groups per anhydro sugar unit. Correspondingly, chitosan has a D.S. of about 0.8 of amino groups as above indicated.

EXAMPLE IX

A series of fiber preparations were made using different commercially available sodium carboxymethyl celluloses. In the designations of these materials, the first number generally defines the approximate D.S. Thus, the number 7 means a D.S. of approximately 0.7 (and in the case of the CMC 7 series, for example, the D.S. range is stated to be 0.65–0.85).

| Preparation | Acidic polysaccharide solution | Chitosan solution |
|---|---|---|
| 1 | 2 l. 0.5% solution of CMC 4 $H_4F$ containing 22 g. $NaHCO_3$. | 1 l. 0.5% chitosan in 0.25% acetic acid containing 8.9 g. citric acid monohydrate and 6 g. anhydrous $CaCl_2$. |
| 2 | 2 l. 0.5% solution of CMC 4 $M_8SF$ containing 22 g. $NaHCO_3$. | As per Preparation 1. |
| 3 | 3 l. 0.5% solution of CMC 7 $H_3SF$ containing 14.3 g. $NaHCO_3$. | Do. |
| 4 | As per Preparation 3 except CMC 7 $M_8SF$. | Do. |
| 5 | As per Preparation 3 except CMC 7 LF. | As per Preparation 1 except 6.9 g. citric acid monohydrate. |
| 6 | 1 l. 0.5% CMC 9 $M_8F$ containing 11 g. $NaHCO_3$. | As per Preparation 1 except 4 g. anhydrous $CaCl_2$. |
| 7 | 750 ml. 0.5% CMC 12 $M_8P$ containing 8.25 g. $NaHCO_3$. | As per Preparation 1 except 4.5 g. anhydrous $CaCl_2$. |

Fiber properties were as follows:

Preparation: Fiber Characteristics
1 ─── Short soft fibers.
2 ─── Short fibers, tough.
3 ─── Very tough fibers.
4 ─── Fibers having good mouthfeel.
5 ─── Fibers having good mouthfeel and chew.
6 ─── Somewhat drier fibers than prep. 5.
7 ─── Fibers a little softer than prep. 6.

EXAMPLE X

A 0.5% solution of chitosan in 0.5% acetic acid containing 0.1% $CaCl_2$ was mixed with a 0.5% solution of low methoxyl pectin. The resulting fibers were very soft (gel-like).

EXAMPLE XI

Example X was essentially repeated except that $CaCl_2$ was used at the 0.5% level and the low methoxyl pectin was replaced by carrageenan gum (Gelcarin®). Tough fibers were obtained. In the absence of $CaCl_2$ the precipitated mass was not filtrable.

EXAMPLE XII

Example X was essentially repeated except no $CaCl_2$ was used and the low methoxyl pectin was replaced by Xanthomonas microbial gum. The resulting product was like gristly fat being extremely difficult to tear apart by chewing.

The embodiments of the invention in which an exclusive property or privilege is claimed are defined as follows:

1. A process of preparing a complex useful as a texturizing agent for extending meats, fish, and fowl and as a building block for foods through the addition of flavors or colors comprising mixing a fluid aqueous solution of chitosan with a fluid aqueous solution of an acidic polysaccharide or an alkali metal salt thereof and recovering the resulting complex, said chitosan and the acidic polysaccharide being used in amounts of less than about 10% by weight in the aqueous solutions thereof and ratios sufficient to form the complex.

2. The process of claim 1 wherein the acidic polysaccharide is carboxymethyl cellulose.

3. The process of claim 1 wherein the acidic polysaccharide is sodium alginate.

4. The process of claim 1 wherein the acidic polysaccharide is carrageenan gum.

5. The process of claim 1 wherein the acidic polysaccharide is Xanthomonas microbial gum.

6. The process of claim 1 wherein the acidic polysaccharide is sodium carboxymethyl guar.

7. The process of claim 1 wherein the acidic polysaccharide is low methoxyl pectin.

8. The process of claim 1 wherein the respective solutions contain about 0.25 to 4% by weight of the chitosan and the acidic polysaccharide.

9. The process of claim 1 wherein the weight ratio of the chitosan to the acidic polysaccharide is in the range of 0.8 to 1.2 and 1.2 to 0.8.

10. The process of claim 1 wherein calcium ions in an amount sufficient to increase the strength of the complex are present during the formation of the complex.

11. The process of claim 1 wherein the acidic polysaccharide is sodium carboxymethyl cellulose, the respective fluid solutions contain from about 0.25 to 4.0% by weight of the chitosan and the sodium carboxymethyl cellulose, the chitosan and sodium carboxymethyl cellulose are used in approximately equal amounts by weight and $CaCl_2$ in an amount sufficient to increase the strength of the complex is present during the formation of the complex.

12. The complex prepared by the proces of claim 1.

13. The complex prepared by the process of claim 10.

14. An extended meat product comprising natural meat and the complex of claim 12.

References Cited

UNITED STATES PATENTS 3,013,883   12/1961   Welcker et al. _____ 99—111

HYMAN LORD, Primary Examiner

U.S. Cl. X.R.

426—224